United States Patent [19]

Elser

[11] Patent Number: 4,483,237
[45] Date of Patent: Nov. 20, 1984

[54] STEERING GEAR WITH AUXILIARY POWER SUPPORT

[75] Inventor: Dieter Elser, Essingen, Fed. Rep. of Germany

[73] Assignee: Zahnradfabrik Friedrichshafen, AG., Friedrichshafen, Fed. Rep. of Germany

[21] Appl. No.: 493,289

[22] Filed: May 10, 1983

[30] Foreign Application Priority Data

May 19, 1982 [DE] Fed. Rep. of Germany ....... 3218844

[51] Int. Cl.³ ............................................. F15B 9/12
[52] U.S. Cl. ........................................ 91/368; 91/380
[58] Field of Search ............... 91/355, 356, 378, 380, 91/368, 382; 74/388 PS; 180/132, 146

[56] References Cited

U.S. PATENT DOCUMENTS

| | | | |
|---|---|---|---|
| 2,193,898 | 3/1940 | Carter et al. | 91/378 |
| 2,237,400 | 4/1941 | Washburn | 91/380 |
| 2,340,029 | 1/1944 | Weingartner . | |
| 3,828,883 | 8/1974 | Rist | 91/374 |
| 3,844,177 | 10/1974 | Bourassa . | |
| 3,964,371 | 6/1976 | Wagner et al. | 91/434 |
| 4,008,782 | 2/1977 | Chanal | 180/132 |

Primary Examiner—Robert E. Garrett
Assistant Examiner—Abram McConnell Bradley
Attorney, Agent, or Firm—Zalkind & Shuster

[57] ABSTRACT

A control valve in a power boost steering system uses hydraulic power for wheel straightening after a steering operation wherein a valve spool is reciprocal with a worm shaft which has an end threadedly carrying a non-rotative but slidable collar to compress springs as the worm shaft is rotated by virtue of being keyed against rotation. Thus, rotation of the worm shaft can actuate the collar axially in either direction against oppositely disposed compression springs depending on direction of steering rotation of the worm shaft by a manually operated steering spindle. When manual steering force on the steering spindle is released, the compressed spring expands to axially move the worm shaft and thus the valve spool through a neutral position which exhausts the cylinder chambers. However, the continued expansion of the compressed spring moves the valve spool to a position whereat pressure flow and exhaust of the cylinder chambers is reversed from the original steering direction. This reversal provides hydraulic power to straighten the vehicle wheels to straight ahead position.

18 Claims, 6 Drawing Figures

STEERING GEAR WITH AUXILIARY POWER SUPPORT

BACKGROUND OF THE INVENTION

Reference is made to the following pending applications having the same assignee as this application: Ser. No. 283,456, filed July 15, 1981; now U.S. Pat. No. 4,442,010: Ser. No. 283,470, filed July 15, 1981; now U.S. Pat. No. 4,417,501: Ser. No. 299,325, filed Sept. 4, 1981; now U.S. Pat. No. 4,421,011.

The referenced applications show construction having the function of providing hydraulic power return of steered wheels from a steered position, utilizing rotary type valves in Ser. No. 283,456 and Ser. No. 283,470. The present invention provides a construction for hydraulic power return utilizing a reciprocating spool valve.

The invention relates to a steering gear having hydraulic power boost, for example, as shown in German Pat. No. 2 24 15 235 (U.S. Pat. No. 3,964,371) having spring means for effecting a neutral position of a valve spool wherein the valve spool is axially shifted by rotation of a worm shaft on which it is carried and the worm shaft having a reciprocal ball nut engaging a gear sector for actuating a steering linkage. In order to permit relative axial movement between a steering spindle, which is rotated by manual force on a steering wheel, and the worm shaft, a tongue and slot coupling is utilized. In such constructions, the centering of the valve spool to neutral position is effected by a collar on the worm shaft biased by oppositely disposed compression springs engageable with respective fixed abutments in the housing on respective sides of the worm shaft collar.

Valve constructions as described above are frequently used in heavy vehicles which have several steering adjustments for the steered wheels. These prior steering arrangements as in lighter vehicles are designed to automatically return wheels from a steered position to straight ahead travel position when manual force on the steering wheel is released. The axis geometry of the adjustments of the vehicle steered wheels effects such straightening, for example, an adjustment of king pin slant. However, there is a disadvantage in relying on the axis geometry of the steered wheels for return to straight position, since manual force must be used in steering the wheels to overcome resistance caused by axis geometry, and this is particularly disadvantageous in the case of heavy vehicles having slow straightening return.

BRIEF DESCRIPTION OF THE PRESENT INVENTION

The present invention is based on the use of an axially shifting and rotative worm shaft having the usual reciprocal ball nut engaging a gear sector and carrying a valve spool fixed for axial shifting with the worm shaft. Also, a collar is carried by the worm shaft having oppositely disposed compression springs acting thereon. However, in the instance of this invention, the collar is threadedly carried on the worm shaft and restrained against rotation. Thus, rotation of the worm shaft by a manually operated steering spindle will reciprocate the collar to compress one spring or the other depending on selected direction of steering. The effect, upon release of manual force on the steering wheel, is that the spring which has been compressed will expand and shift the worm shaft. The valve spool moves with the worm shaft from the position in which it has powered one power cylinder chamber while exhausting the other, to a reverse position, which reverses the operation of the power cylinder.

Accordingly, by hydraulic power, the steered wheels are moved to straight ahead position. In such return movement, the construction effects rotation of the worm shaft to bring the valve spool back to neutral position and centering of the collar.

Thus, the arrangement provides that the valve is in neutral position when the steered wheels have been returned to straight ahead position, with the reverse pressure flow causing this action whereat the worm shaft is once more in position available for the next steering operation. The invention permits the use of steering axes with a king pin slant of 0° without sacrificing the advantage of an increase in booster steering power with increase in steering angle of the steered wheels. Thus, as the steering angle increases, the springs which act on the worm shaft for centering it are pretensed strongly to compensate for higher acting pressures.

Inasmuch as the straightening of the vehicle wheels no longer depends on steering geometry but upon the power of a servo cylinder, smaller steering gearing may be used for heavier vehicles. This, of course, results in a savings of cost and weight.

As to specific construction, the collar is internally threaded and carried on a threaded extension end of the worm shaft and disposed within a small cup or housing secured to the end of a steering housing. The steering housing carries the worm shaft valve spool, ball nut and gear sector, all conventional in construction. Accordingly, it is a simple matter to provide a slidable key arrangement between the collar and the housing cup which permits axial movement of the collar by preventing rotation upon rotation of the worm shaft. Also, the construction provides in assembling for ready adjustment of the valve spool to neutral position by mere rotation of the cup which changes the axial position of the collar and the threaded end of the worm shaft, inasmuch as the valve spool is fixed on the worm shaft.

Reference is made to the U.S. Pat. Nos. 2,340,029 to Weingartner and 3,844,177, to Bourasso, showing differential nut devices which are used in rapid return mechanisms. The principle of such mechanisms is utilized in the present invention to provide movement of a valve spool beyond neutral position when in return movement from a steering position so as to reversely pressurize a power cylinder to straighten the vehicle wheels back to straight ahead position by hydraulic power. Thus, the threads are of opposite hand.

The present invention will now be described in conjunction with the appended drawing, in which.

Figure 1:
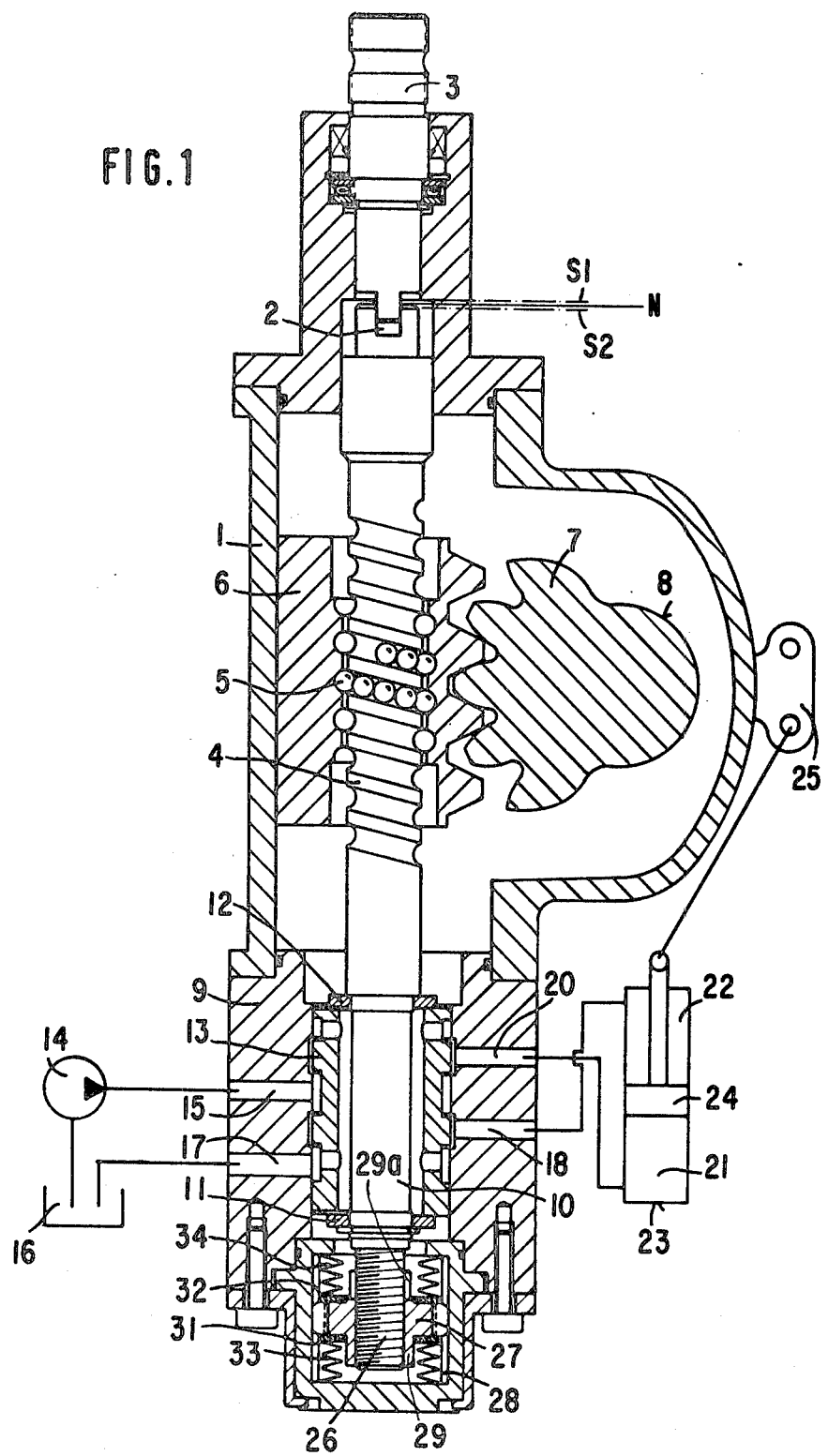
FIG. 1 is a cross section taken longitudinally through a steering housing showing a neutral position of a valve spool carried on a worm shaft.

Referring now to the drawing, the invention comprises a steering housing 1 having a rotative worm shaft 4 articulated to a spindle 3 by way of a tongue and slot coupling 2 whereby it can be seen that the worm shaft can reciprocate axially relative to the steering spindle due to tongue and slot arrangement obvious from FIG. 1. The worm shaft has the usual ball chain 5 within a ball nut 6 whereby the worm shaft can reciprocate the ball nut which has rack teeth engaging a gear sector 7. Gear sector 7 is, in the usual manner, coupled by way of a stub shaft 8 to a steering linkage system (not shown) for steering the steered wheels of a vehicle.

Worm shaft 4 at an end opposite the steering spindle end has an extension 10; such extension is encompassed by a valve spool 13 held axially against relative movement on the worm shaft as by snap rings 11 and 12. Valve spool 13 is encompassed by a valve sleeve 9. These valve members have coacting lands and grooves which in the usual manner control pressure flow or exhaust by way of pressure channel 15 connected with an engine driven pump 14, and an exhaust channel 17 connected to an oil reservoir 16. Pressure conduits 18 and 20 lead respectively to pressure chambers 21 and 22 of a power boost servo cylinder 23. Piston 24 of the servo cylinder is connected with the steering rod system and the stub shaft 8, as symoblized, by connection to member 25, all in conventional fashion.

Figure 2:
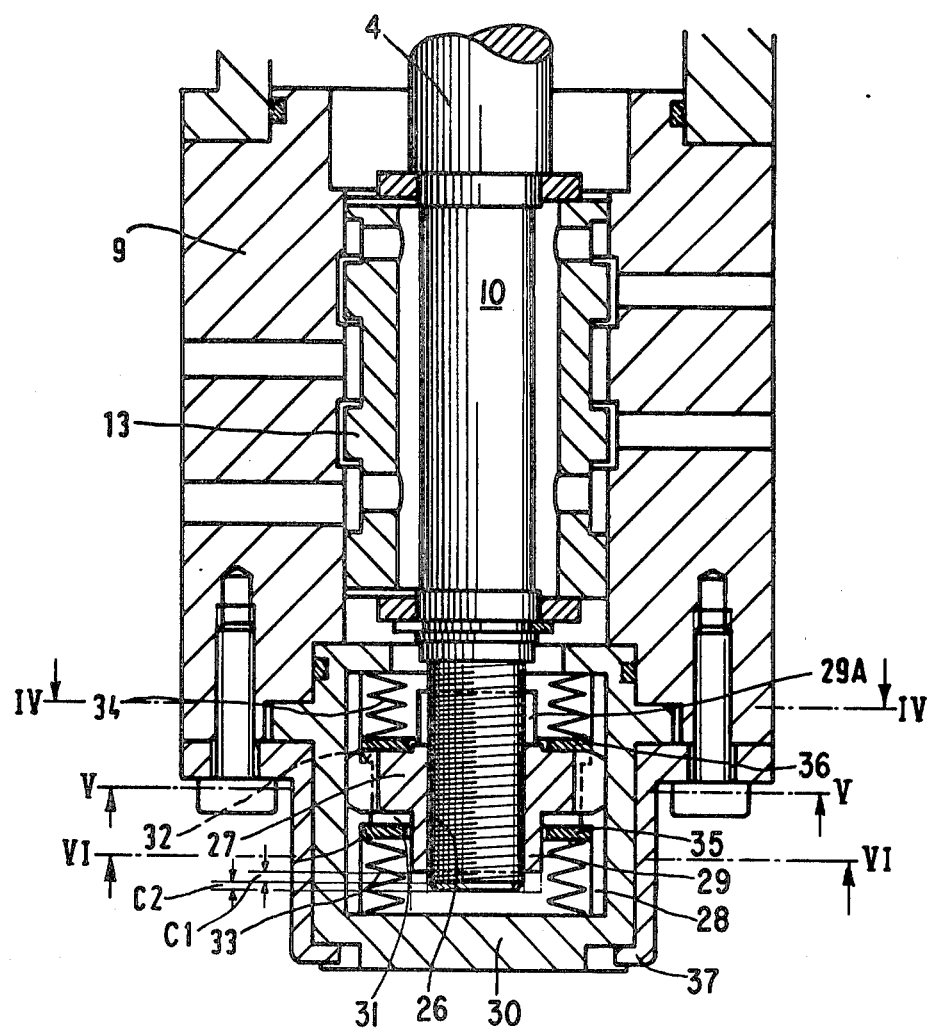
FIG. 2 is an enlarged longitudinal section of the portion of FIG. 1 showing the end of the worm shaft in a momentary neutral position at the end of a steering movement, when the vehicle operator releases turning force on the steering wheel, before reverse movement of the valve spool to straighten the wheels by hydraulic pressure.

In accordance with the invention, the extension 10 surrounded by the valve spool 13 has a threaded end 26 which carries a coactingly threaded collar 27, as most clearly seen in FIG. 2. Collar 27 (FIGS. 2, 4, 5, 6) is prevented from rotating by axial guide means comprising grooves 28 diametrically opposed in the wall of a separate small end housing or cup 30. Such guide means may be of any suitable type, e.g., provided in the form of a rib, etc., to provide for a sliding keyway. The collar has radial ribs, such as 28a, FIG. 3, which slide in the respective grooves.

Collar 27 has extending skirts 29 on both sides thereof which are axially slotted, as at 29A. Such slots, e.g., two or more in number, provide a radially resilient radial grip of collar 27 on the threaded end 26 which resilience is pretensed inwardly to prevent axial play or looseness between the threaded end 26 and collar 27. Limit stop ledges or shoulders 31 and 32 are recessed into the grooves. Spring abutment discs or washers 35 and 36 are provided with respective radial sides of collar 27 against which abut respective superimposed compression dish spring sets 33 and 34. Such spring means on each side of the collar are confined in cup 30, as shown.

Figure 4:
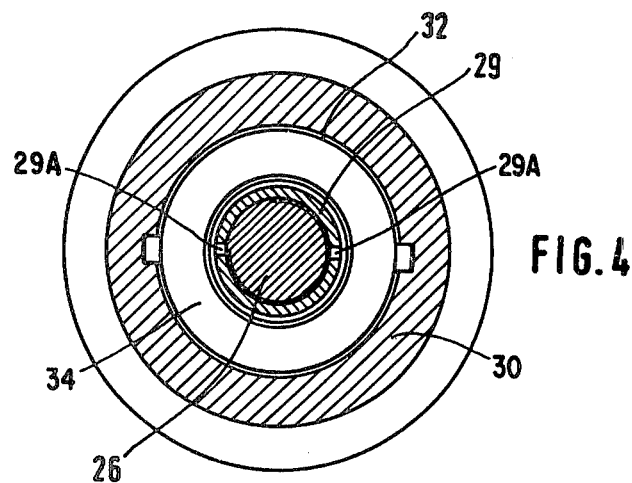
Figure 5:
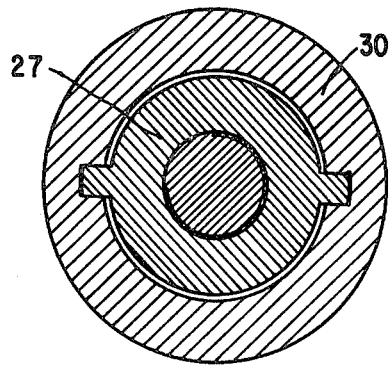
Figure 6:
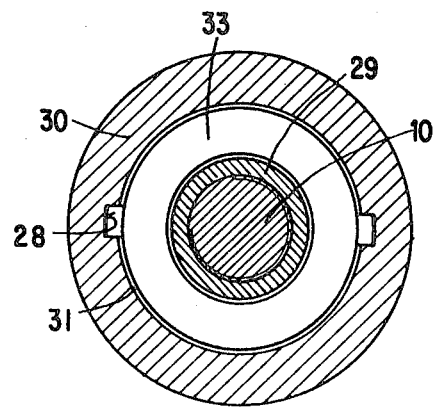

The ledges 31 and 32 are the ends of counterbores in cup 30, as indicated in FIGS. 4 and 6.

The springs are pretensed and act against collar 27 via washers 35 and 36 in conjunction with abutting respective shoulders 31 and 32 to effect a neutral or center position for collar 27, with valve spool 13 in neutral position when no steering operation is in progress, and hydraulic flow is open circuited in the system from pump to tank, as illustrated in FIG. 1.

The cup 30 is secured to the steering housing by a cap 37 fastened by bolts, as shown, to the steering housing. The construction permits easy assembly of the collar, springs and washers with adjustment for a neutral position of the collar 27 and the valve spool 13 by merely rotating cup 30 before clamping it by means of the cap 37 and the bolts.

OPERATION

FIG. 1 shows the neutral position of the valve spool 13 for straight ahead traveling with no manual force being exerted on steering spindle 3. Such position is designated as N on FIG. 1, to show the axial relationship of steering spindle 3 and worm shaft 4. With rotation of steering spindle 3 and worm shaft 4 clockwise, there is initially no movement of gear sector 7, which is mechanically connected to the vehicle steered wheels, due to friction of the road surface on the wheels, all as well known. Accordingly, the rotation of the worm shaft, passing through the initially stationary ball nut 6, is caused by the coarse worm thread nut to shift axially upward. Such displacement is permitted by the tongue and slot joint 2. Rotation of worm shaft 4 thus caused by manual steering of a steering wheel for a predetermined arc permits the upward movement of the worm shaft through the distance S1, as seen on FIG. 1. Since the shaft 4 rises when turned clockwise, with nut 6 initially stationary, the worm thread on the shaft is a lefthand thread. Accordingly, valve spool 13 being captive on the worm shaft is moved upwardly the same distance. Thus, pressure flow via channel 15 from pump 14 is communicated via pressure conduit 20 to pressure chamber 21 of servo cylinder 23. Such pressurization causes piston 24 to move upwardly to assist in the steering of the vehicle by hydraulic power. Simultaneously, collar 27 is moved upwardly on threaded end 26 inasmuch as the collar cannot rotate because of the slidable keying arrangement of guide means, to a distance dependent on degree of steering spindle 3 rotation. Note in FIG. 2 the gap between washer 36 and ledge 32. Since collar 27 rises, due to restraint against rotation upon clockwise rotation of shaft 4, the thread on extension 26 is a righthand thread.

The steering wheel (not shown) is turned during the operation of piston 24 in order to hold valve spool 13 in the upper S1 position.

Since degree of shifting of collar 27 is dependent on the degree of steering deflection at the steering wheel acting via threaded coaction with threaded end 26. The collar shift will always be greater than the shift of shaft 4, due to differential nut action, as shown in U.S. Pat. Nos. 2,340,029 and 3,844,177, aforementioned.

This shift of the collar 27 causes compression of the spring 34. However, spring 33 having been pretensed to a predetermined degree remains in the position as shown in FIG. 2, expansion being limited by abutment of washer 35 abutting the shoulder 31. Also, as seen in FIG. 2, is the distance C1 that washer 36 is moved away from respective shoulder 32 to compress spring 34, it being noted that C1 (FIG. 2) is always greater than S1 (FIG. 1) and C2 always greater than S2. Such overtravel of the collar due to the differential nut action results in overtravel of the valve spool beyond neutral during return of the steering wheels to straight ahead, and, accordingly, reverses the pressure to cylinder 23, FIG. 3.

Figure 3:
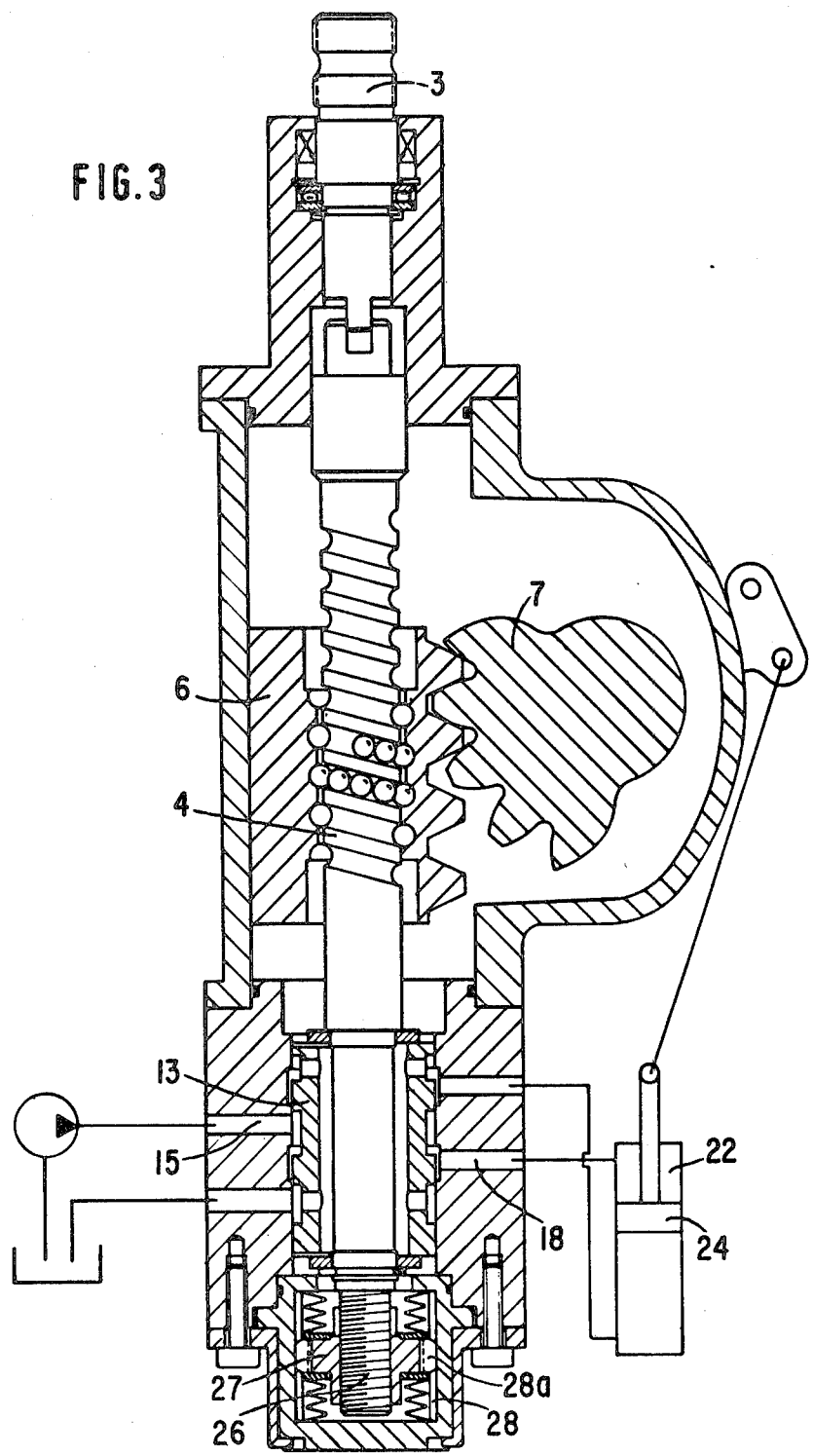
FIG. 3 is similar to FIG. 1, but showing the valve spool in reversing hydraulic power subsequent to the neutral position of FIG. 2, and FIGS. 4, 5 and 6 are radial sections through lines IV, V, and VI of FIG. 2.

When manual force on the steering wheel is released, the axial movement of worm shaft 4 ceases, due to cessation of rotating of steering spindle 3. At this time, spring 34 under heavy compression commences to expand, thus pushing collar 27 downwardly along with valve spool 13 together with worm shaft 4 into the neutral position shown in FIG. 2, at which time the steering spindle is again at the position N as shown in FIGS. 1 and 2. In such neutral position, the pressurized chamber 21 as well as the pressure from pump 14 flow back to the oil tank 16. Pressure chamber 21 is thus pressureless, as is in fact the opposite pressure chamber 22, which will be readily apparent from consideration of the valve spool position shown in FIG. 2. At this time, displacement of collar 27 on threaded end 26 is still active and continues to bias worm shaft 4, due to compression in spring 34 downwardly beyond the neutral position of valve spool 13. Thus, worm shaft 4 carrying valve spool 13 moves downwardly from the position N to the position S2, the position below the neutral position N. This causes the reversal of flow through the valve members, as seen in FIG. 3, whereby it will be noted that the chamber 22 has now been pressurized. In effect, a reversal of flow now pressurizes the servo cylinder.

Accordingly, the steered wheels are being hydraulically powered back to a straight ahead position by reverse action of servo cylinder 23. Movement of collar 27 ceases due to engagement of washer 36 with shoulder 32, the condition shown in FIG. 1 for the neutral position in which collar 27 is centered between shoulders 31 and 32. Collar 27 is not yet in neutral position with respect to the end of threaded extension 26, as will be explained subsequently in detail save to say that as the wheels are straightened, shaft 4 is rotated by pinion sector 7, counterclockwise, and thus threaded end 26 rotates to move upward to neutral position of FIG. 1. However, compressive pretensed force of both springs is now equalized on worm shaft 4 to hold the collar 27 in the position whereat the valve spool 13 is below neutral position by the distance S2 (FIG. 1), pressurizing chamber 22 (FIG. 3) and straightening the steered wheels.

During reverse steering pressure to the cylinder for straightening the wheels by hydraulic power, as above set forth and as will be noted from FIG. 3, the collar 27 is restored to centering between the limit stops 31 and 32 but has not been restored to its neutral position with respect to the threaded extension 26. This will be noted by comparing the end of the threaded extension 26 in FIG. 3 with FIG. 1 in which the very end of the threaded extension end is flush with the very end of the lower skirt 29 while in FIGS. 2 and 3 it will be noted that the end of extension 26 is below the end of the lower skirt 29 by the distance S2 of FIG. 1.

Also, as will be noted in FIG. 3, the valve spool 13 is off center, i.e., in the position that pressurizes chamber 22 as compared with the centered, i.e., neutral position for open circuit flow as seen in FIGS. 1 and 2.

This condition of reverse pressurizing of the servo cylinder continues until collar 27 has been restored to the neutral position with respect to the end of the threaded extension 26 as shown in FIG. 1. Thus, collar 27 as seen on FIG. 3, being displaced on the threaded extension 26 holds the valve spool 13 downward for distance S2 in the reverse flow position of FIG. 3, which is, to a distance C2 downward of the collar.

Ultimately, the reverse pressurization of the servo cylinder ceases and the vehicle wheels are straightened, valve spool 13 being once again in the neutral open flow circuit position of FIG. 1. This is effected by rotation of the worm shaft 4. Such axial shift is the result of the threaded extension 26 moving axially in reverse direction by rotation in the then stationary collar 27.

Rotation of worm shaft 4 to restore the neutral condition is caused by clockwise rotation of gear sector 7, as viewed in FIG. 3, due to the mechanical connection between the steering linkage and the gear sector. As hydraulic power straightens the steered wheels, the rotation of gear sector 7 shifts ball nut 6 axially which through the ball chain drives worm shaft 4 rotatively moving the valve spool upwardly to open circuit neutral position whereat all action ceases, and collar 27, although not having moved, is restored to neutral position relative to the threaded end 26 of the worm shaft, as viewed in FIG. 1, by the upward movement of worm shaft 4.

It is obvious that for steering in the opposite direction the worm shaft 4 would be turned counterclockwise by steering spindle 3 acted on by manual force on a steering wheel. In such a case worm shaft 4 moves the distance S2 and collar 27 moves the distance C2 and it would be the dish spring set 33 that would be compressed by virtue of collar 27 moving downward to bring about the position of the worm shaft to the level S2, as seen in FIG. 1. All functions then occur in the opposite sense to that described above for a clockwise rotation of worm shaft 4. In other words, servo cylinder 23 would then be pressurized so that piston 24 would move downwardly while valve spool 13 would move upwardly at the end of the steering operation to reversely pressurize servo cylinder 23 for straightening the wheels.

In either case, upon movement of valve spool 13 from the reversed position caused by either compressed spring set 33 or 34, the neutral position of the valve spool restores the open circuit flow of FIG. 1.

I claim:

1. A hydraulic servo cylinder booster steering valve mechanism of the kind comprising a housing means and having a rotative steering spindle coupled to an axially movable and rotative worm shaft (4) having a thread carrying a ball nut (5) meshing with a gear sector which connects with a double acting servo-motor for actuation of a steering linkage, and having a valve spool (13) carried on the worm shaft axially movable, including a valve spool centering means for neutral position thereof wherein said centering means comprises a collar (27) on said worm shaft and spring means (33, 34) acting on opposite sides of said collar and against limit stops (31, 32) on opposite sides of said collar;

the improvement comprising a thread for a threaded connection (26) between said collar and said worm shaft;

said threads being of opposite hand;

means (28, 28a) preventing rotation of said collar whereby said collar is shifted axially by said threaded connection in one direction or the other depending on rotative steering direction of said worm shaft;

wherein one spring means or the other is spaced under stress from the respective limit stop by axial shift of said collar from a neutral position during a steering operation effected by manual force on said spindle;

release of manual force permitting the stressed spring means to reverse the axial shift of said collar whereby to shift said worm shaft and valve spool in an axial direction past neutral position to reversely pressurize said servo cylinder for returning the steered wheels of a vehicle back to straight ahead position.

2. The combination as set forth in claim 1, wherein said means for preventing rotation of said collar comprises relatively slidable rib and groove means intermediate said collar and said housing means.

3. The combination as set forth in claim 1, said housing means including a steering housing and a cup (30) carried by said steering housing, said collar being reciprocal in said cup, and said means for preventing rotation comprising grooves in said cup; said collar having ribs extending into said grooves.

4. The combination as set forth in claim 1, said housing means including a steering housing and a cup carried by said steering housing in which said collar is reciprocal and means (31, 32) in said cup effecting said limit stops.

5. The combination as set forth in claim 1, wherein said means for preventing rotation of said collar comprises ribs slidable in grooves, said ribs being intermediate said collar and said grooves; said housing means including a steering housing and a cup carried by said steering housing, said collar being reciprocal in said cup, and said grooves being in said cup; said collar having said ribs extending into said grooves.

6. The combination as set forth in claim 1, wherein said means for preventing rotation of said collar comprises ribs slidable in grooves, said ribs being intermediate said collar and said grooves, said housing means including a steering housing and a cup carried by said housing means; said collar being reciprocal in said cup and said grooves being in said cup; said collar having ribs extending into said grooves; and means in said cup effecting said limit stops effected by recessed shoulders in said cup.

7. The combination as set forth in claim 1, wherein said means for preventing rotation of said collar comprises ribs slidable in grooves, said ribs being intermediate said collar and said grooves, said housing means including a steering housing and a cup carried by said housing means, said collar being reciprocal in said cup, and said grooves being in said cup; said collar having ribs extending into said grooves, and means in said cup effecting said limit stops.

8. The combination as set forth in claim 1, including skirts extending axially from each side of said collar and provided with radial resilience to frictionally prevent axial movement of said collar with respect to said worm shaft.

9. The combination as set forth in claim 1, wherein said threaded connection comprises a threaded axial extension of said worm shaft having a threaded connection within said collar.

10. The combination as set forth in claim 1, including skirt means extending axially from said collar and provided with radial resilience to frictionally prevent axial movement of said collar with respect to said worm shaft.

11. The combination as set forth in claim 10, wherein said radial resilience is effected by slot means in said skirt means permitting radial inward bending of said skirt means.

12. The combination as set forth in claim 1, including skirts extending axially from each side of said collar and provided with radial resilience to frictionally prevent axial movement of said collar with respect to said worm shaft, wherein said threaded connection comprises a threaded axial extension of said worm shaft having a threaded connection within said collar, wherein said radial resilience is provided by axial slotting of said skirts and inward compressing thereof against said threaded axial extension.

13. The combination as set forth in claim 1, wherein said spring means comprises a series of superimposed dish springs.

14. The combination as set forth in claim 1, said housing means including a steering housing; a cup rotative relative said steering housing and said collar being slidably keyed to said cup so as to adjust a neutral position of said spool valve by virtue of rotation of said cup to rotate said worm shaft, and means for securing said cup in a rotated position relative to said steering housings.

15. The combination as set forth in claim 10, wherein said radial resilience is effected by slot means in said skirt means permitting radial inward bending of said skirt means, wherein said spring means comprises sets of superimposed dish springs, said cups being rotative on said housing so as to adjust a neutral position of said spool valve by virtue of rotation of said worm shaft and means for securing said cup in a rotated position; said sets of spring means being confined within said cup on respective sides of said collar.

16. The combination as set forth in claim 1, wherein said spring means comprises compression springs on the sides of said collar; means confining said springs under stress against said collar; and limit stop means spaced to accommodate said collar therebetween in a centered position effected by said springs wherein sides of said collar are flush with respective surfaces of said limit stop means in centered position of said collar.

17. The combination as set forth in claim 16, including a washer interface between said springs and respective sides of said collar.

18. The combination as set forth in claim 1, wherein said collar is displaced axially with respect to said worm shaft by virtue of said threaded connection upon rotation of said worm shaft during a steering operation and displaced with respect to said limit stops, the displacement with respect to said limit stops being overcome during expansion of a stressed spring and said valve spool being restored to neutral position by said threaded connection upon reverse rotation of said worm shaft during return of said steered wheels to a straight ahead position.

* * * * *